US008731627B2

(12) United States Patent
Inabathuni et al.

(10) Patent No.: US 8,731,627 B2

(45) Date of Patent: May 20, 2014

(54) METHOD OF USING A SMART PHONE AS A TELEMATICS DEVICE INTERFACE

(75) Inventors: Tarun Inabathuni, Detroit, MI (US); Maria A. Frendberg, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 169 days.

(21) Appl. No.: 13/079,350

(22) Filed: Apr. 4, 2011

(65) Prior Publication Data

US 2012/0252364 A1 Oct. 4, 2012

(51) Int. Cl.
*H04B 7/00* (2006.01)
*H04M 1/00* (2006.01)

(52) U.S. Cl.
USPC ..................... 455/575.9; 455/556.1; 455/41.2

(58) Field of Classification Search
USPC ........ 455/414.1, 456.1, 457, 41.2, 41.3, 66.1, 455/556.1, 575.9; 340/988, 991, 995.1
See application file for complete search history.

(56) References Cited

U.S. PATENT DOCUMENTS

2004/0266439 A1* 12/2004 Lynch et al. .................. 455/444
2005/0143912 A1* 6/2005 Park .............................. 701/209
2009/0287412 A1* 11/2009 Menzel et al. ................ 701/213
2009/0322558 A1* 12/2009 Videtich et al. .......... 340/870.07
2010/0222962 A1* 9/2010 Haydn et al. .................... 701/36
2010/0266001 A1* 10/2010 Choi et al. .................... 375/222
2011/0184789 A1* 7/2011 Kirsch ......................... 705/14.1
2012/0028680 A1* 2/2012 Breed ........................ 455/556.1
2012/0086395 A1* 4/2012 Kim et al. ..................... 320/109
2012/0163255 A1* 6/2012 Choi ............................. 370/310
2012/0172010 A1* 7/2012 Oman et al. ............... 455/414.1
2012/0197523 A1* 8/2012 Kirsch .......................... 701/426
2012/0252431 A1* 10/2012 Gee et al. ................... 455/422.1
2012/0252475 A1* 10/2012 Farrell et al. .................. 455/450
2013/0023239 A1* 1/2013 Odinak ......................... 455/411

* cited by examiner

*Primary Examiner* — Andrew Wendell

(74) *Attorney, Agent, or Firm* — Anthony Luke Simon; Reising Ethington P.C.

(57) ABSTRACT

A system and method for controlling a vehicle telematics unit via a smart phone using the steps of: storing a software application for remotely controlling the telematics unit at the smart phone; using the stored software application to communicatively connect the smart phone with the telematics unit via a short-range wireless communication link; receiving data from the telematics unit that is used to display a menu of telematics service selections at the smart phone; receiving a telematics service selection from a vehicle occupant at the smart phone that is chosen from one of the displayed telematics service selections; and transmitting a command that controls at least one function of the vehicle based on the received telematics service selection from the smart phone to the telematics unit over the short-range wireless communication link.

20 Claims, 2 Drawing Sheets

METHOD OF USING A SMART PHONE AS A TELEMATICS DEVICE INTERFACE

TECHNICAL FIELD

The present invention relates generally to vehicles and more particularly to a method of operating a vehicle telematics unit.

BACKGROUND OF THE INVENTION

Vehicle manufacturers outfit their vehicles with an increasing number of wireless communications capabilities. Telematics units installed in modern vehicles can wirelessly communicate both voice and data communications between the vehicle and a variety of recipients, such as a central facility, over a wireless carrier network. The telematics unit can wirelessly communicate over short-range wireless channels, as well. Besides their communication capabilities, telematics units can receive various types of input, such as requests from vehicle occupants, and output can be generated in response to that input. At the same time, many vehicle owners may also carry smart phones that can also communicate using short-range wireless channels.

SUMMARY OF THE INVENTION

According to an aspect of the invention, there is provided a method of controlling a vehicle telematics unit. The steps include storing a software application for remotely controlling a vehicle telematics unit at a smart phone; using the stored software application to communicatively connect the smart phone with the vehicle telematics unit via a short-range wireless communication link; receiving data from the vehicle telematics unit that is used to display a menu of telematics service selections at the smart phone; receiving a telematics service selection from a vehicle occupant at the smart phone that is chosen from one of the displayed telematics service selections; and transmitting a command that controls at least one function of the vehicle based on the received telematics service selection from the smart phone to the vehicle telematics unit over the short-range wireless communication link.

According to another aspect of the invention, there is provided a method of controlling a vehicle telematics unit. The steps include detecting the presence of a smart phone that includes software capable of remotely controlling a vehicle telematics unit via a short-range wireless communication link between the vehicle telematics unit and the smart phone; transmitting vehicle data capable of display on the smart phone over the short-range wireless communication link from the vehicle telematics unit to the smart phone; receiving a telematics service command that is in response to vehicle data displayed at the smart phone via the short-range wireless communication link from a vehicle occupant using the smart phone; and controlling one or more vehicle functions using the received telematics service command sent from the smart phone.

According to yet another aspect of the invention, there is provided a method of controlling a vehicle telematics unit. The steps include storing software at a smart phone for remotely controlling vehicle functions using the Bluetooth RFCOMM protocol over a short-range wireless communication link between a vehicle telematics unit and the smart phone; transmitting vehicle data for generating a telematics service menu offering telematics service commands on the display of the smart phone from the vehicle telematics unit to the smart phone via the short-range wireless communication link; receiving the selection of one of the telematics service commands made by a vehicle occupant at the smart phone; transmitting the selected telematics service command to the vehicle telematics unit via the short-range wireless communication link; and controlling one or more vehicle functions based on the transmitted telematics service command using the vehicle telematics unit.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

The method described below uses a handheld wireless device, such as a smart phone, to communicate with and also control a vehicle telematics unit. The smart phone can carry out communication and control features using a software application stored at the smart phone. While some vehicles carry telematics units that can monitor vehicle functions and wirelessly communicate data over a short-range wireless communication link—as well as a cellular communication channel—these vehicles may have visual displays that are limited in their capabilities. For instance, some vehicles that carry vehicle telematics units may include a visual display that is capable of showing only one line of text at a time. At the same time, the vehicle telematics unit may include speech recognition capabilities that allow the vehicle occupant to recite verbal queries that may benefit from responses shown on additional display space. Smart phones often include a display screen that is capable of showing graphical images and speakers or audio outputs that can audibly play sound. Additionally, smart phones can communicate using short-range wireless communication protocols, cellular communications over a wireless carrier system, or both. Vehicle data can be received by the smart phone from the vehicle telematics unit via a short-range wireless communication link and displayed to a vehicle occupant using the smart phone.

When a vehicle occupant carries a smart phone, the vehicle telematics unit can then use the display of that smart phone to show the occupant more detailed information, such as a menu containing a plurality of telematics service selections or geographical maps used to provide turn-by-turn directions. In this case, the vehicle telematics unit may no longer be limited by a single-line textual display installed on the vehicle but can display more detailed information using the smart phone. The smart phone can also receive commands from the occupant and transmit the more detailed information to the telematics unit in response to those commands. In another example, the vehicle telematics unit can also determine that the smart phone is capable of greater wireless data communication speeds than can be achieved by the telematics unit. As a result, the vehicle telematics unit can leverage the wireless communication capability of the smart phone to transmit and receive data via the smart phone over a cellular wireless communication system by transferring data between the telematics unit and the smart phone over the short-range wireless communication link. In short, the combination of the display and control features of the smart phone can be integrated with the communication, vehicle monitoring, and information generation capabilities of telematics unit.

Figure 1:
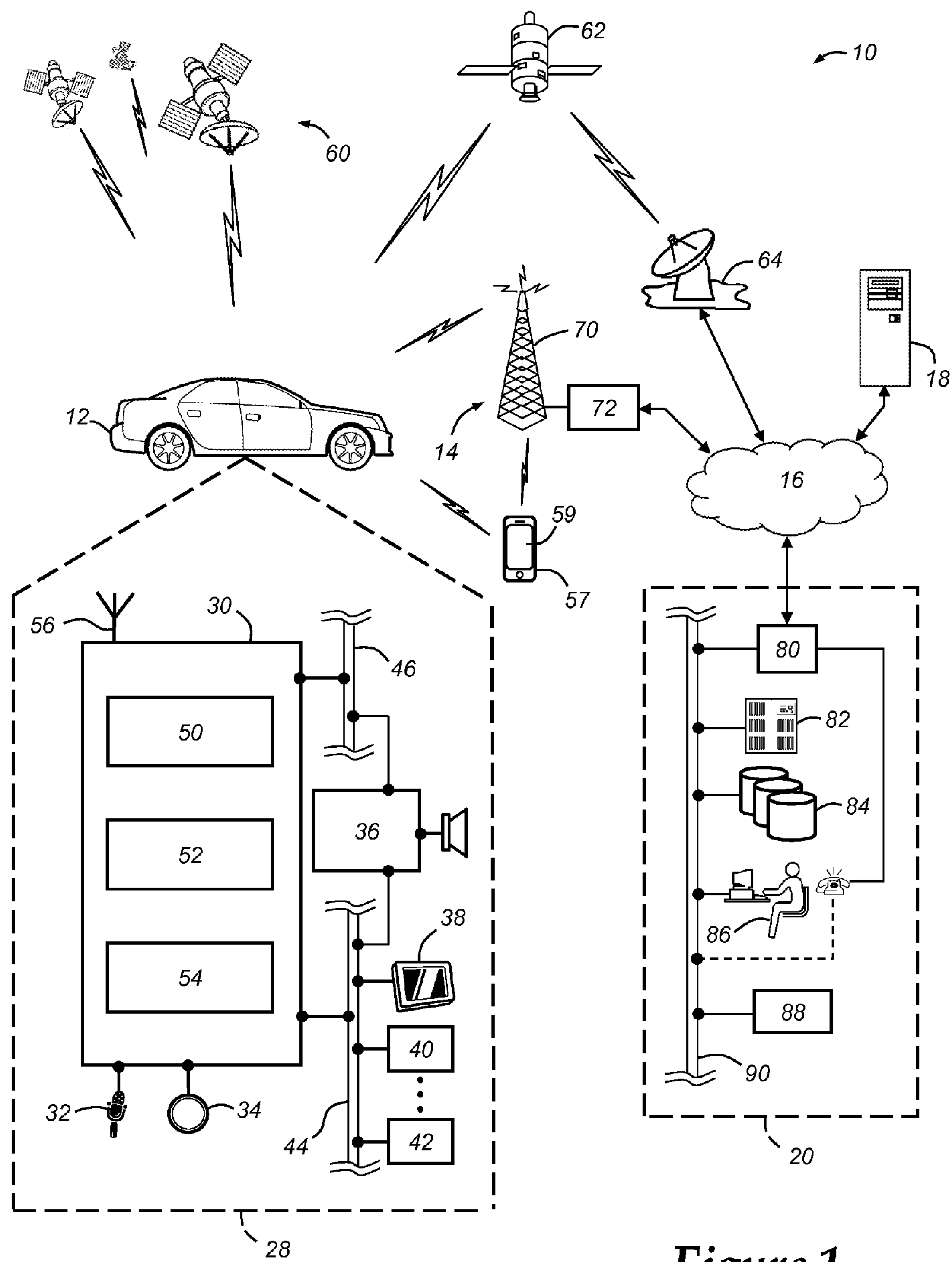
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Android™ manufactured by Motorola, Inc. While the smart phone 57 may also include the ability to communicate via cellular communications using the wireless carrier system 14, this is not always the case. For instance, Apple manufactures devices such as the iPad™, iPad 2, and the iPod Touch™ that include the processing capability, the display 59, and the ability to communicate over a short-range wireless communication link. However, the iPod Touch and some iPads do not have cellular communication capabilities. Even so, these and other similar devices may be used or considered a type of smart phone 57 for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
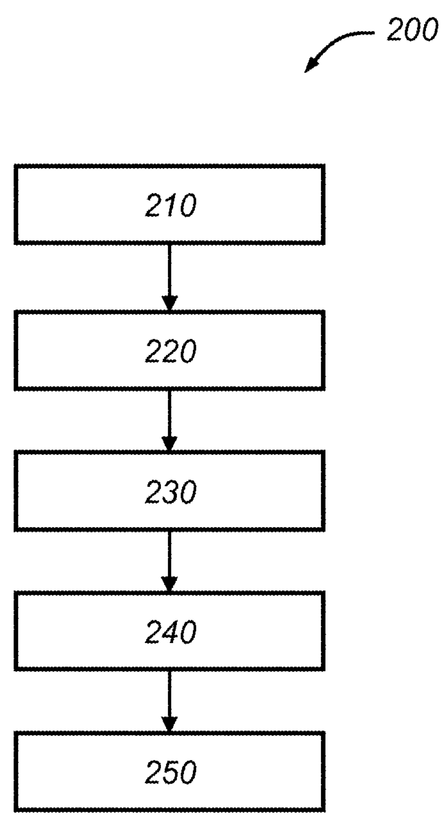
FIG. 2 is a flow chart of a method of operating a telematics unit.

Turning now to FIG. 2, there is shown a method 200 of controlling a vehicle telematics unit 30. The method 200 begins at step 210 by storing software at the smart phone 57 for remotely controlling the vehicle telematics unit 30 using the smart phone 57. The software can be an application that controls vehicle functions. This software can be made available as an application in an "app store" that is maintained by the hardware/software retailers or manufacturers of the smart phone 57. A common example of the "app store" is operated by Apple. In one example, the software stored at the smart phone 57 that can control the vehicle telematics unit 30 may be obtained wirelessly from the "app store." The software can then be operated using the processing capabilities of the smart phone 57. In another example, the software can be stored in the memory of the smart phone 57 at the point of manufacture or sale. In this case, the owner or operator of the vehicle 12 could, when purchasing a smart phone 57, select a number of software applications to be included with the smart phone 57 at the time of delivery—including the software used to control the vehicle telematics unit 30. The software can enable the smart phone 57 to display menu selections for a vehicle occupant to choose from as well as commands corresponding to those selections that may allow the occupant to control the vehicle telematics unit 30. This will be discussed in more detail below. The method 200 proceeds to step 220.

At step 220, the method detects the presence of the smart phone 57 that includes software capable of remotely controlling the vehicle telematics unit 30 via the short-range wireless communication link between the vehicle telematics unit 30 and the smart phone 57. The short-range wireless communication link can be established using any one of the short-range communication protocols discussed above. The method 200 can be described using the Bluetooth protocol. The short-range wireless communication link can be established by pairing the smart phone 57 with the vehicle telematics unit 30. A query can be sent from the vehicle telematics unit 30 to the smart phone 57 that asks whether software for controlling the vehicle telematics unit 30 is installed or saved at the smart phone 57. If the vehicle telematics unit 30 receives a reply over the short-range wireless communication link confirming the existence of such software, the telematics unit 30 and the smart phone 57 can begin to communicate. The method 200 proceeds to step 230.

At step 230, the stored software communicatively connects the smart phone 57 with the vehicle telematics unit 30 via the short-range wireless communication link. Once paired, the vehicle telematics unit 30 and/or the smart phone 57 can direct the software to communicate using the RFCOMM protocol based on the Bluetooth short-range wireless connections and exchange data, such as commands from the smart phone 57 to the vehicle telematics unit 30. The RFCOMM protocol can wirelessly emulate serial cable line settings and the status of a serial port and can be used for the transfer of serial data. In this case, the vehicle telematics unit 30 can directly connect with the smart phone 57 using the RFCOMM protocol and the pairing of the vehicle telematics unit 30 and the smart phone 57 can be carried out based on the RFCOMM protocol. Over the short-range wireless communication link—using the RFCOMM protocol or otherwise—the vehicle telematics unit 30 can be controlled via commands that are represented by codes. In one example, these codes can be provided by a user interface table (UIT) that includes a number for each action. The UIT can be stored at the vehicle telematics unit 30 and the smart phone 57. That way, the UIT number can be sent over the short-range wireless communication protocol to the vehicle telematics unit 30 or the smart phone 57 and that number can be interpreted and translated into the appropriate command. The method 200 proceeds to step 240.

At step 240, vehicle data for generating a telematics service menu offering telematics service commands on the smart phone display 59 of the smart phone 57 is transmitted from the vehicle telematics unit 30 to the smart phone 57 via the short-range wireless communication link and the selection of one of the telematics service commands made by a vehicle occupant is received. Vehicle data can generally relate to the operation of the vehicle 12. Examples of vehicle data include turn-by-turn directions, diagnostic trouble codes (DTCs), and messages received from the call center 20. Telematics service selections that represent commands can be chosen at the smart phone 57 from one of the telematics service selections displayed on the smart phone 57 and received in response to vehicle data that is displayed at the smart phone 57. The vehicle telematics unit 30 can provide not only vehicle data but also computer-readable information that the smart phone 57 can use to display a menu of telematics service selections. This computer-readable information can establish any one or more variables, such as the number of telematics service options presented to the vehicle occupant, static data shown on the smart phone display 59, the font of the characters displayed, the color of the smart phone display 59, and more. In short, the computer-readable information can control the overall appearance of the information shown on the smart phone display 59.

The telematics service menu used at the smart phone 57 can also provide master-slave status to the user of the telematics service menu via the smart phone 57. That is, even though the vehicle telematics unit 30 can receive selections from devices mounted on the vehicle 12, such as pushbutton(s) 34, the telematics service menu use at the smart phone 57 may be encoded to override selections made from inputs other than those displayed on the smart phone 57. Thus, the smart phone menu becomes the master control, while the other inputs are subordinate to the smart phone menu. The method 200 proceeds to step 250.

At step 250, the selected telematics service command is transmitted to the vehicle telematics unit 30 via the short-range wireless communication link and one or more vehicle functions are controlled using the vehicle telematics unit 30 based on the transmitted telematics service command. This selected command can control at least one function of the vehicle. Using the menu shown on the smart phone display 59, the occupant can select an option, such as by manually pressing the smart phone display 59 where a button representing a selection is shown. In one example, the vehicle telematics unit 30 can determine the vehicle occupant is experiencing some type of emergency, such as a vehicle accident. This can be determined when the vehicle telematics unit 30 receives a signal from the VSM 42 that, in this example, can detect the occurrence of a vehicle accident. In response, the vehicle telematics unit 30 can generate a telematics service menu to send the smart phone 57 via the short-range wireless communication link. The menu can then be shown on the smart phone display 59 and include one or more offered selections such as "call ambulance" that can direct the vehicle telematics unit 30 to telephone an ambulance or hospital, "call police" that can direct the vehicle telematics unit 30 to put the vehicle occupant in communication with the local police station or public safety access point (PSAP), or "I'm Okay" that would instruct the vehicle telematics unit 30 to alert the call center 20 that the vehicle occupant does not need assistance. Each of these selections can be made using the smart phone 57 and sent to the vehicle telematics unit 30 over the short-range wireless link.

In another example, the vehicle occupant using the smart phone 57 can request turn-by-turn directions from one location to another location. The user or vehicle occupant can verbally request these directions using the speech recognition function of the vehicle telematics unit 30. In response, the vehicle telematics unit 30 can generate information to create a menu that includes a keypad for selecting address numbers and/or address alphabet characters for the occupant to select. This information can be transmitted via the short-range wireless communication link to the smart phone 57 where the menu can be generated and shown on the smart phone display 59. The vehicle occupant can then select the appropriate numbers and alphabet characters shown on the smart phone display 59 thereby sending commands representing these selections to the vehicle telematics unit 30 over the short-range wireless link. These commands can be sent to the vehicle telematics unit 30 using the RFCOMM protocol described above. The vehicle telematics unit 30 can transmit the present location of the vehicle 12 and the destination address entered using the smart phone 57 to the call center 20, which can return the turn-by-turn directions to the vehicle telematics unit 30. While the turn-by-turn directions can be audibly played in the vehicle using the audio system 36, the vehicle telematics unit 30 can also send a geographical map to the smart phone 57 over the short-range wireless communication link to be displayed on the smart phone display 59. The menu shown on the smart phone display 59 and used to select the address can then be replaced with an image of the geographical map. This map can include icons, such as an icon representing the destination on the map and an icon representing the vehicle 12 as it moves along the map. The position of the vehicle icon on the map can be updated using GPS coordinates generated by the GPS module 40 located on the vehicle 12.

Other communications between the vehicle telematics unit 30 and the smart phone 57 are possible. For instance, if the vehicle telematics unit 30 is unable to receive GPS satellite signals or generate GPS coordinates, the vehicle telematics unit 30 can query the smart phone 57 to obtain GPS coordinates. That is, if the smart phone 57 is able to receive GPS coordinates while the vehicle telematics unit 30 is not, then the telematics unit 30 can command the smart phone 57 to send GPS coordinates to the telematics unit 30 over the short-range wireless link. This can also be helpful during the presentation of turn-by-turn directions. For example, if the vehicle telematics unit 30 no longer can receive GPS satellite signals while the occupant is receiving turn-by-turn directions, the vehicle telematics unit 30 can send a request over the short-range wireless communication link to receive GPS coordinates from the smart phone 57 and use those received GPS coordinates in the execution and/or presentation of the turn-by-turn directions. In another example, the call center 20 can send messages relating to vehicle operation or telematics subscriptions to the vehicle telematics unit 30. These messages can be sent from the vehicle telematics unit 30 via the short-range wireless link to the smart phone 57 and shown on the smart phone display 59. The method 200 then ends.

It is to be understood that the foregoing is a description of one or more preferred exemplary embodiments of the invention. The invention is not limited to the particular embodiments disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiments will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a vehicle telematics unit, comprising the steps of:

(a) storing a software application for remotely controlling a vehicle telematics unit at a smart phone;

(b) establishing a short-range wireless communication link between the smart phone and the vehicle telematics unit when the smart phone is at the vehicle;

(c) receiving data via the short-range wireless communication link from the vehicle telematics unit that is used by the software application to display a menu of telematics service selections at the smart phone;

(d) receiving a telematics service selection from a vehicle occupant using the smart phone that is chosen from one of the displayed telematics service selections; and (e) transmitting a command that controls at least one function of the vehicle based on the received telematics service selection from the smart phone to the vehicle telematics unit over the short-range wireless communication link.

2. The method of claim 1, further comprising the step of communicating data between the vehicle telematics unit and the smart phone via the short-range communication link using an RFCOMM protocol.

3. The method of claim 1, wherein global positioning system (GPS) coordinates are received at the vehicle telematics unit from the smart phone via the short-range communication link.

4. The method of claim 1, further comprising the step of processing turn-by-turn directions using GPS coordinates generated by the smart phone and data provided by a central facility that is received at the vehicle telematics unit.

5. The method of claim 1, further comprising the step of sending turn-by-turn directions from a central facility to the vehicle telematics unit and creating a geographic map for display at the smart phone using data included with the turn-by-turn directions.

6. The method of claim 1, wherein the smart phone uses a visual display that includes a touch-screen graphical user interface that shows the menu of telematics service selections and receives the telematics service selection from the vehicle occupant.

7. The method of claim 1, wherein steps (c)-(e) are carried out using the stored software application.

8. A method of controlling a vehicle telematics unit, comprising the steps of:

(a) detecting the presence of a smart phone that includes software capable of remotely controlling a vehicle telematics unit via a short-range wireless communication link between the vehicle telematics unit and the smart phone;

(b) transmitting vehicle data capable of display on the smart phone over the short-range wireless communication link from the vehicle telematics unit to the smart phone;

(c) receiving a telematics service command that is in response to vehicle data displayed at the smart phone via the short-range wireless communication link from a vehicle occupant using the smart phone; and (d) controlling one or more vehicle functions using the received telematics service command sent from the smart phone via the short-range wireless communication link.

9. The method of claim 8, further comprising the step of using an RFCOMM protocol to communicate data over the short-range wireless communication link.

10. The method of claim 8, wherein global positioning system (GPS) coordinates are received at the vehicle telematics unit from the smart phone via the short-range communication link.

11. The method of claim 8, further comprising the step of processing turn-by-turn directions using GPS coordinates generated by the smart phone and data provided by a central facility that is received at the vehicle telematics unit.

12. The method of claim 8, further comprising the step of sending turn-by-turn directions from a central facility to the vehicle telematics unit and creating a geographic map for display at the smart phone using data included with the turn-by-turn directions.

13. The method of claim 8, wherein the smart phone uses a visual display that includes a touch-screen graphical user interface that presents a menu of telematics service selections and receives the telematics service command from the vehicle occupant.

14. The method of claim 8, wherein steps (b)-(d) are carried out using the stored software application.

15. A method of controlling a vehicle telematics unit, comprising the steps of:

(a) storing software at a smart phone for remotely controlling vehicle functions using a Bluetooth RFCOMM protocol over a short-range wireless communication link between a vehicle telematics unit and the smart phone;

(b) transmitting vehicle data for generating a telematics service menu offering telematics service commands on the display of the smart phone from the vehicle telematics unit to the smart phone via the short-range wireless communication link;

(c) receiving the selection of one of the telematics service commands made by a vehicle occupant at the smart phone;

(d) transmitting the selected telematics service command to the vehicle telematics unit via the short-range wireless communication link; and (e) controlling one or more vehicle functions based on the transmitted telematics service command using the vehicle telematics unit.

16. The method of claim 15, wherein global positioning system (GPS) coordinates are received at the vehicle telematics unit from the smart phone via the short-range communication link.

17. The method of claim 15, further comprising the step of processing turn-by-turn directions using GPS coordinates generated by the smart phone and data provided by a central facility that is received from the vehicle telematics unit.

18. The method of claim 15, further comprising the step of sending turn-by-turn directions from a central facility to the vehicle telematics unit and creating a geographic map for display at the smart phone using data included with the turn-by-turn directions.

19. The method of claim 15, wherein the smart phone uses a visual display that includes a touch-screen graphical user interface that shows the telematics service commands and receives the selection of a telematics service command from the vehicle occupant.

20. The method of claim 15, wherein steps (b)-(e) are carried out using the stored software application.

* * * * *